Oct. 28, 1969

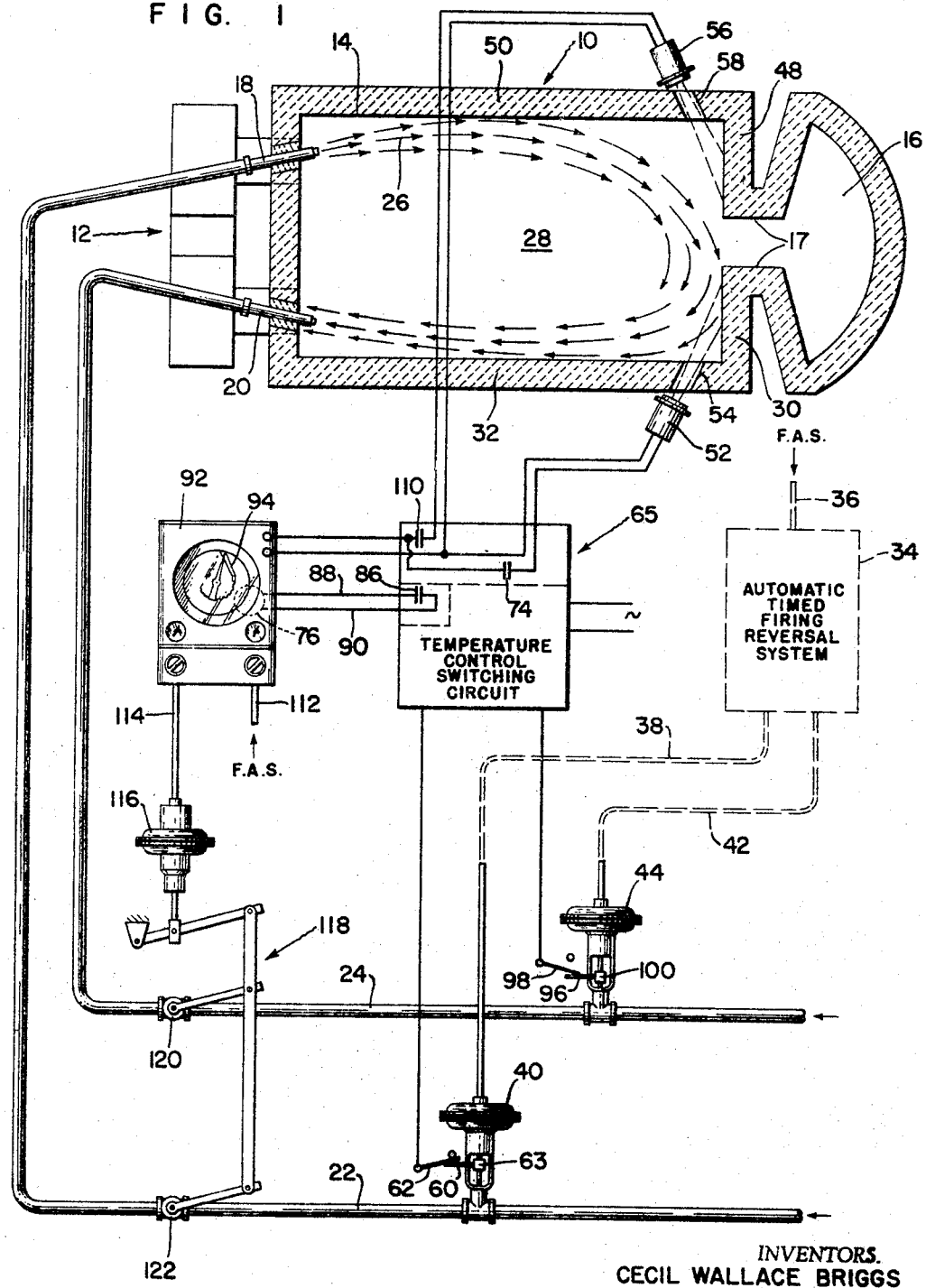

C. W. BRIGGS ET AL 3,475,151

CYCLIC BURNER CONTROLLING APPARATUS FOR GLASS MELTING FURNACE

Filed June 22, 1966

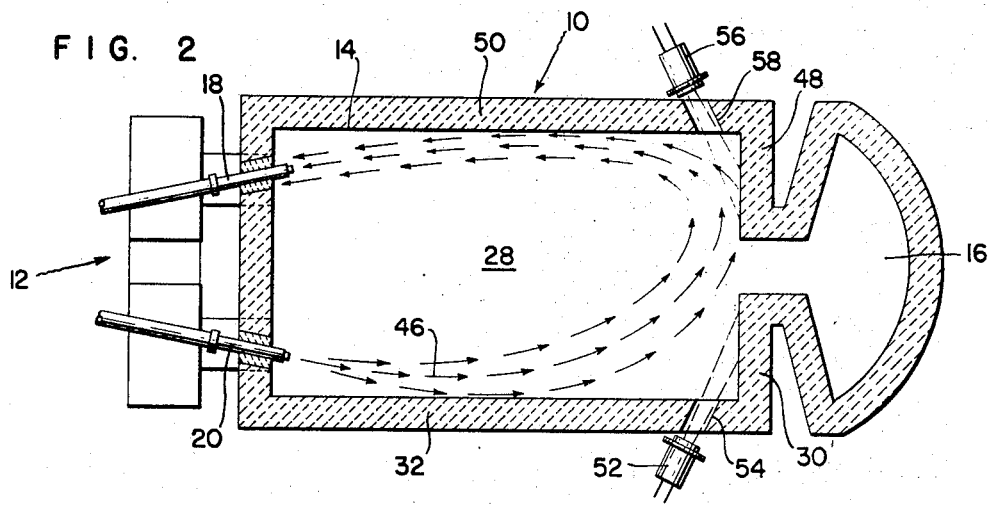

FIG. 2

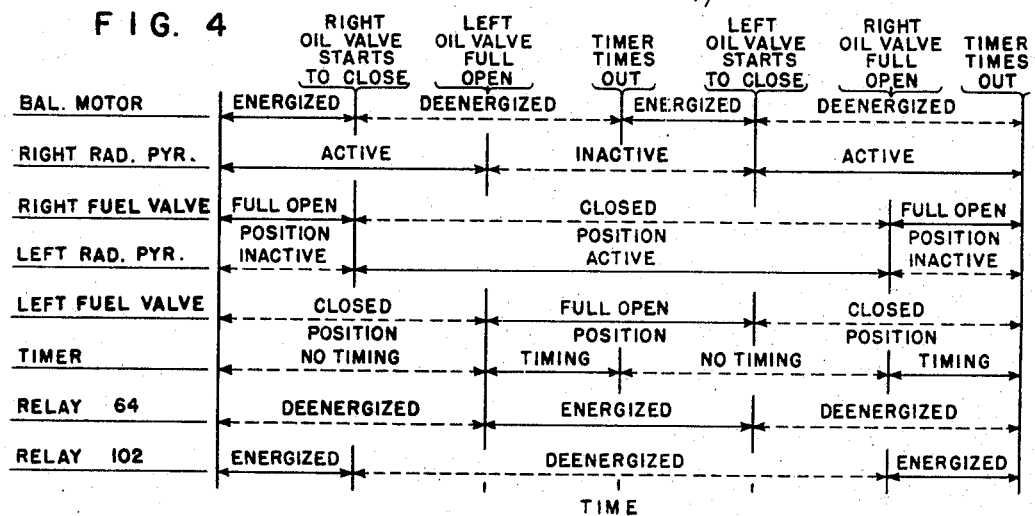

FIG. 4

| | RIGHT OIL VALVE STARTS TO CLOSE | LEFT OIL VALVE FULL OPEN | TIMER TIMES OUT | LEFT OIL VALVE STARTS TO CLOSE | RIGHT OIL VALVE FULL OPEN | TIMER TIMES OUT |
|---|---|---|---|---|---|---|
| BAL. MOTOR | ENERGIZED | DEENERGIZED | | ENERGIZED | DEENERGIZED | |
| RIGHT RAD. PYR. | ACTIVE | | INACTIVE | | ACTIVE | |
| RIGHT FUEL VALVE | FULL OPEN POSITION | CLOSED POSITION | | | FULL OPEN POSITION | |
| LEFT RAD. PYR. | INACTIVE | ACTIVE | | | INACTIVE | |
| LEFT FUEL VALVE | CLOSED POSITION | FULL OPEN POSITION | | CLOSED POSITION | | |
| TIMER | NO TIMING | TIMING | | NO TIMING | TIMING | |
| RELAY 64 | DEENERGIZED | ENERGIZED | | DEENERGIZED | | |
| RELAY 102 | ENERGIZED | DEENERGIZED | | | ENERGIZED | |

TIME

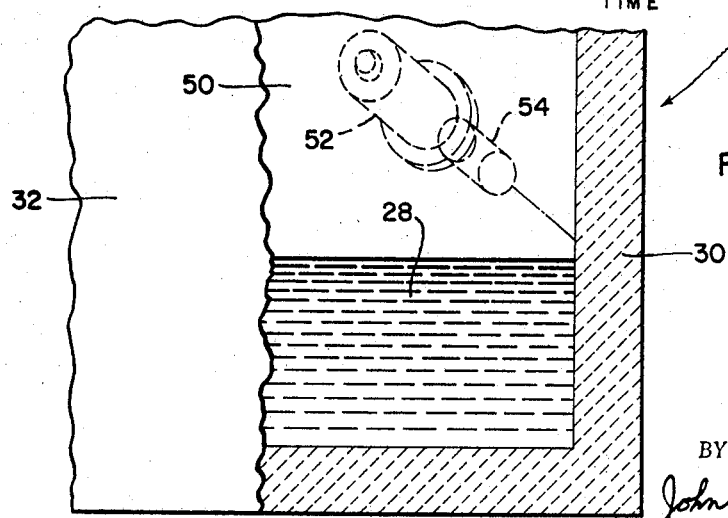

FIG. 3

INVENTORS.
CECIL WALLACE BRIGGS
PAUL M. SPATZ

BY John Thau Stevenson

AGENT.

Oct. 28, 1969 C. W. BRIGGS ET AL 3,475,151
CYCLIC BURNER CONTROLLING APPARATUS FOR GLASS MELTING FURNACE
Filed June 22, 1966 3 Sheets-Sheet 3

INVENTORS.
CECIL WALLACE BRIGGS
BY PAUL M. SPATZ

*John Shaw Stevenson*
AGENT.

United States Patent Office 3,475,151
Patented Oct. 28, 1969

3,475,151
CYCLIC BURNER CONTROLLING APPARATUS FOR GLASS MELTING FURNACE
Cecil Wallace Briggs, Wyncote, and Paul M. Spatz, Zeiglerville, Pa., assignors to Honeywell Inc., Minneapolis, Minn., a corporation of Delaware
Filed June 22, 1966, Ser. No. 559,604
Int. Cl. C03b 5/24
U.S. Cl. 65—162                    1 Claim

ABSTRACT OF THE DISCLOSURE

A controller to maintain the thermal stability of a regenerative glass melting furnace wherein (1) one of two separate reversing valves in each of two oil supply conduits is closed while the controller is employed to adjust the position of a first flow regulating valve in the other of the fuel oil supply conduits that is directing fuel through a burner in a clockwise direction against a first bridge wall surface that is adjacent one side of a passageway that is allowing molten glass to flow from a melter to a refiner section of the furnace and wherein (2) a first control signal generating radiant energy responsive means connected to send the signal to the controller is employed to simultaneously sense the temperature of a surface of the bridge wall that is adjacent another side of the passageway that is out of contact with the flame and when another one of the two separate reversing valves in the supply conduits is closed the controller is employed to adjust the position of a second flow regulating valve in the other of the fuel oil supply conduits that is directing fuel through a burner in a counterclockwise direction against a second bridge wall surface that is adjacent another side of the passageway, a second control signal generating radiant energy responsive means is connected with the controller to simultaneously sense the temperature of a surface of the bridge wall that is adjacent another side of the passageway that is out of contact with the flame to send said control signal to the controller.

---

It is an object of the present invention to disclose an improvement in an apparatus to precisely control the temperature of materials being melted to a preselected molten state in a furnace.

It is well known that while the ingredients are heated in a melter of a glass furnace into a molten state the sulfates are ofttimes leached out from these ingredients and a haze is formed above the ingredients and makes it impossible to measure the temperature of these ingredients with a temperature sensor, e.g. a radiation pyrometer. It is also well known that when certain ingredients are placed into the melter section of the furnace they will form a layer of scum on top of the molten glass and prevent a measurement of the temperature of the glass in the melter from being sensed by a temperature sensor, e.g. a radiation pyrometer.

Since these haze and scum layers on the glass are present it is therefore necessary to measure the temperature of the molten glass in the melter by a different temperature measuring technique, such as the apparatus to be hereinafter disclosed.

When a deviation on the correct time-temperature relationship pattern has heretofore occurred in the melting of the ingredients in the melter which the glass manufacturer is required to maintain for different weights of these ingredients undesired air bubbles are ofttimes formed in the molten glass mixture which will make the glassware that is made from this molten glass unsuitable for sale. When these bubbles are discovered in the molten material in the melter it is possible to force these bubbles out of the material to the atmosphere by introducing additional fuel so that the temperature of this heated glass can be raised to a much higher temperature level than that which is economically desired.

It is therefore a more specific object of the invention to disclose an apparatus for a reversing-regenerative furnace in which the direct firing is automatically reversed on a predetermined time or optimum temperature basis that can be relied on to more precisely control the temperature of sand and other associated ingredients placed therein that are required to be melted at economical temperature levels into a bubble free homogeneous molten glass condition in its melter portion than has heretofore been possible.

During reversal of the furnace when both burners are cut-off, it has heretofore been the practice to sight a hand optical pyrometer on a selected brick of the bridgewall which best represents the temperature of the ingredients in the furnace. This is done in order to determine to what degree the rate of fuel flowing to the burner should thereafter be manually altered.

One of the problems encountered with this type of control is that large drops in the temperature of the furnace occur over the short period of time during which both burners are shut down. It is, therefore, necessary for the operator to determine at what point it would be best on a temperature cooling time curve to take a hand optical pyrometer temperature reading of the furnace wall so that future manual control of the fuel flow through the burners could be correctly adjusted.

A second known mechanism used to regulate the firing rate of this type of furnace automatically positions a fuel flow control valve in a temperature control loop using a radiation pyrometer sighted on and measuring the temperature of a refractory block in the roof of the furnace with this second mechanism, the radiation pyrometer sights into the bottom of the block that forms an aperture extending down to one and one-half inches from the bottom of the block. Temperature measurements using this mechanism do not represent a true temperature of the molten glass because:

(1) The difference in temperature between the bottom of the aperture and the bottom surface of the brick decreases as the bottom of the brick erodes and (2) The roof is not a portion of the furnace whose temperature is varied in a manner than can be correlated with the temperature of the molten glass under measurement as is the bridgewall temperature with which the molten glass is in contact.

Because of the aforementioned shortcomings it is therefore still the present-day practice for the operator who is measuring the temperature of glass by either of the aforementioned techniques to periodically measure bridgewall temperature manually with the hand optical pyrometer and reset the temperature control index in his futile attempt he constantly makes in trying to maintain a desired bridgewall temperature.

It is one of the objects of the invention to obviate the aforementioned problems by making use of a control system that employs two radiation pyrometers that are sighted on opposite sides of the furnace bridgewall and which are operably connected to automatically control the rate of fuel being introduced into the furnace in accordance with the bridgewall temperature being sensed by the pyrometers.

It is another object of the invention to disclose an improved control apparatus of the aforementioned type which eliminates the need for an operator to periodically reposition the control set point of a furnace fuel flow controller in accordance with the reading he acquires through the use of a temperature measurement of his bridgewall with a hand optical pyrometer as was required with the previously mentioned techniques that use the temperature of a furnace block as its temperature sensing point.

It is another object of the present invention to disclose for the first time a temperature control system that will automatically affect the raising and/or lowering of the temperature of the furnace in accordance with changes occurring in temperature of its bridgewall which, in turn, varies in a very close relationship with the temperature of the glass under measurement in the melter portion of the furnace.

It is still another object of the invention to disclose an improved apparatus of the aforementioned type that employs an automatically timed switching circuit to prevent furnace temperature control from being affected by changes occurring in the temperature of the bridgewall during the period of time in which a new reverse firing position of the burners occur and during the short period thereafter during which an unstable flame pattern is present in the furnace.

It is another object of the present invention to disclose an improved temperature control apparatus for a furnace that will make sure that during the aforementioned burner reversal period and unstable flame period it will hold the flow of fuel into the furnace at the same rate as that which existed before the burner reversal and the unstable flame took place.

It is still another object of the present invention to disclose a control system of the aforementioned type in which a radiation pyrometer is located on opposite walls of the furnace to alternately take the temperature measurement of the ingredients in the melter in terms of the bridgewall temperature only after the burner associated with these walls in which the pyrometers are mounted is connected to supply a stable flame pattern for the furnace whose initial portion is directed against the wall through which the bridgewall temperature measurement is being made.

A better understanding of the present invention may be had when the following detailed description is read in connection with the accompanying drawing in which:

FIGURE 1 shows a general arrangement of a control apparatus for a reversing-regenerative furnace and further shows a control condition in which a stable flame pattern is initially being admitted by one of the two burners against one side wall of the furnace and how one of two radiation pyrometers are employed to take the measurement of the bridgewall through the side of the furnace;

FIGURE 2 is a view showing how a stable flame pattern is initially admitted by the other of the two burners against the other opposite side wall of the furnace and how the other of the two radiation pyrometers are employed to take the measurement of the bridgewall through that side;

FIGURE 3 shows the portion of the bridgewall immediately above the ingredients in the melter portion of the furnace against which each of the radiation pyrometers are sighted;

FIGURE 4 shows the timed sequence of the temperature measuring and controlling actions affected by the control apparatus of FIGURE 1 during a burner firing and burner shut-off condition;

Figure 5:
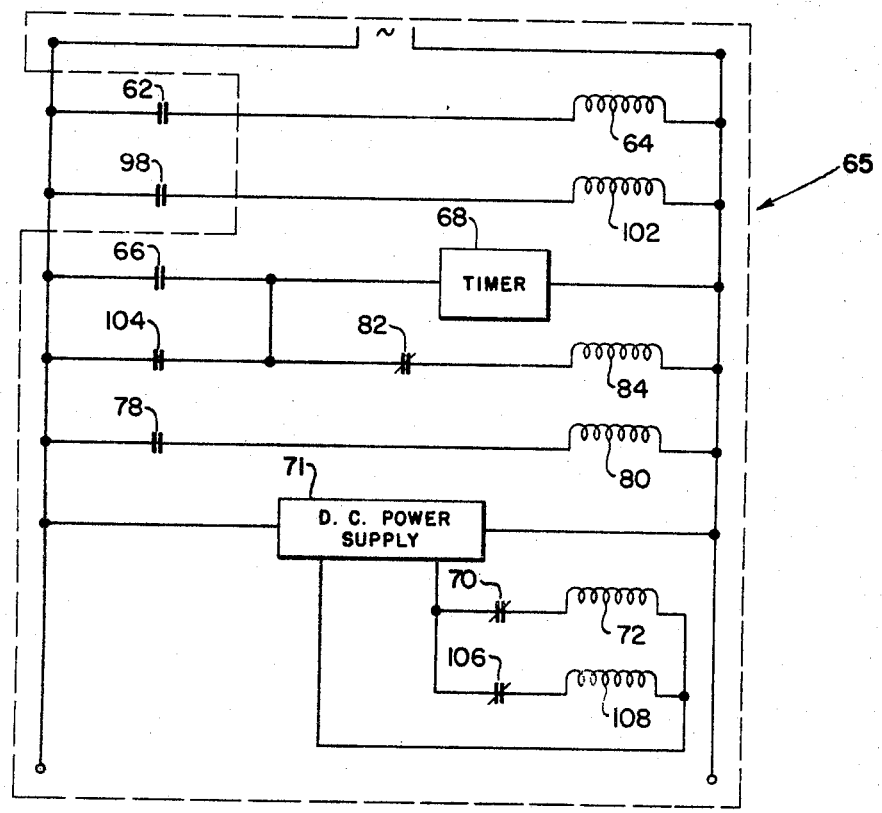
FIGURE 5 is an electrical circuit diagram of the temperature control switching circuit used in the control apparatus of FIGURE 1 and, FIGURE 6 is a time-temperature measuring chart showing the desired stable substantially uniform furnace temperature control effect which the control system, shown in FIGURE 1, can produce.

FIGURE 1 shows a commercially available reversing-regenerative furnace 10 that is comprised of a regenerative section 12, a melter section 14, and a refiner section 16 having a passageway 17 connecting the melter section 14 with the refiner section 16.

The rear wall melter section 14 contains two burners which will be hereinafter referred to as the left burner 18 and the right burner 20.

One end of each of the separate conduits 22, 24 is shown connected to their respective burners 18, 20 and each of the other ends of these conduits is connected to a fuel supply source, not shown. This fuel supply source supplies fuel under pressure through the conduit 22, 24 in the direction of the arrows shown in the lower right corner of FIGURE 1.

When the furnace is fired by the left burner 18 a flame 26 is spread in a substantially clockwise fashion across the top of the ingredients 28 adjacent the left side wall of the furnace 10, along the bridgewall 30 adjacent the opposite right side wall 32 and into the regenerative section 12. In this way heat is not only transmitted to melt the ingredients 28 to a molten state but also to transmit heat to the regenerator 12 to preheat the air being sent to the furnace 10.

While this clockwise heating of the furnace 10 takes place a commercially available pneumatic automatic timed firing reversal system 34 is constructed to receive a filtered pressurized air supply F.A.S. by way of a conduit 36. The timed fired reversal system 34 is also connected by way of conduit 38 to a spring return diaphragm actuated valve 40 to apply an air pressure signal thereto to retain the reversal valve 40 in conduit 22 in an opposite position so that a steady flow of fuel will be transmitted to the burner 18.

While the aforementioned clockwise heating of the furnace 10 takes place the reversal system 34 which is connected by way of conduit 24 to the reversal valve 44 will be transmitting a pressure signal thereto to retain this valve 44 in a closed position to prevent fuel from flowing through the conduit 24 to the burner 20 while the valve 40 remains open.

After a fixed period of time the automatic reversal system 34 then closes both reversal valve 40, 44 so that the gas in the furnace 10 can be purged for a short period of time.

The automatic timing firing reversal system 34 is then arranged to open the valve 44 and to keep valve 40 closed during a reverse or counterclockwise flame heating operation of the furnace 10. Under this FIGURE 2 condition the flame 46 will be spread in a substantially counterclockwise fashion across the top of the ingredients 28 adjacent the right side wall of the furnace 10, along the bridgewall 48, the opposite left side wall 50, and thence into the regenerative section 12.

After another fixed period of time the automatic reversal system 34 again closes both valves 40, 44 so that the gases in the furnace can again be purged and the four cycle operation of this automatic timed firing reversal system 34 is repeated.

A temperature responsive means such as a radiation pyrometer 52 is fixedly positioned on the external right side wall surface of the furnace 10 for directing its sight through an aperture 54 in the right side wall of the furnace 10 against the bridgewall 30 in the manner shown in FIG. 1, 2, and 3. This pyrometer may be of the type disclosed in the T. R. Harrison Patent 2,357,193.

A second similar sensing means which is also preferably a radiation pyrometer 56 is shown fixedly positioned on the external left side wall surface of the furnace 10 so that its sight line is directed through an aperture 58 in the left side wall portion of the furnace 10 against the bridgewall portion 48.

When the left reversing valve 40 is moved to an open position a lug 60 will have moved the left reversing valve switch 62 associated with the stem 63 of this valve 40 to a closed position. Closing of the switch 62 energizes relay coil 64 of the temperature control switching circuit 65 which simultaneously closes contact 66 to start the timer 68, as shown in FIG. 5 of the drawing, and opens contact 70 to D.C. power source 71 and thus de-energizes coil 72 which in turn opens switch contact 74. This action allows the radiation pyrometer 56, which under FIG. 1 condition has the least amount of flame in its path to sense the temperature of the bridgewall 48. However, no recording of the radiation pyrometer 56 will take place until the timer 68 times out and the flame 26 is stabilized. This is so because the balancing motor 76 has been cut out by the action of the timer 68 which causes the timer contact 78 to close. This action energizes relay coil 80 and this opens contact 82 and de-energizes relay 84 to open contact 86 connected by way of conductors 88, 90 to the balancing motor 76. This action will maintain the pen driving balancing motor 76 in a de-energized non-recording position until the timer 68 times out.

After the timer 68 has been timed out, the timer contact 78 opens and de-energizes relay coil 80. Contact 82 is closed, coil 84 is energized, contact 86 is closed, the balancing motor 76 is energized, and a recording of the temperature sensed by the left radiation pyrometer 56 commences.

The automatic timed firing reversal system 34 causes the left reversal valve 40 to close while the right reversal valve 44 still remains closed for purging of the furnace gases.

As the aforementioned left reversal valve 40 closes, the limit switch 62 opens and de-energizes relay coil 64, the contact 70 closes, energizing relay coil 72. Energization of relay coil 72 closing contact 74 connecting the right radiation pyrometer 52 to the potentiometric measuring circuit of unit 92 and another contact 66 opens to enable the relay coil 84 to be de-energized. Contact 86 now opens and thereby de-energizes balancing motor 76. This action permits the instrument to hold a recording instrument pen 94 in its last temperature sensing position while the aforementioned gases in the furnace are purged and until a stabilization of the flame pattern is established.

After the previously mentioned furnace gas purge the automatic reversal system 34 then sends a signal through conduit 42 to open the right reversal valve 44.

When the right reversing valve 44 is moved to an open position a lug 96 will have moved the right reversing valve switch 98 associated with the stem 100 of this valve 44 to a closed position. Closing of the switch 98 energizes relay coil 102 which simultaneously closes contact 104 to start the timer 68, as shown in FIG. 5 of the drawing and opens contact 106 to D.C. power source 71 and then de-energizes coil 108 which in turn opens switch contact 110.

This action allows the radiation pyrometer 52 which under FIG. 2 condition has the least amount of flame in its path to sense the temperature of the bridgewall 30. However, no recording of the radiation pyrometer 52 will take place until the timer 68 times out and the flame 46 is stabilized. This is so because the balancing motor 76 has been cut out by the action of the timer 68 which causes the timer contact 78 to close. This action energizes relay coil 80 which opens contact 82 and de-energizes relay 84 to open contact 86 connected by way of conductor 88, 90 to the balancing motor 76. This action will maintain the pen driving balancing motor 76 in a de-energized, non-recording position until the timer 68 again times out.

After the timer 68 has been timed out, the timer contact 78 opens and de-energizes relay coil 80. Contact 82 is closed, coil 84 is energized, contact 86 is closed, the balancing motor 76 is energized, and a recording of the temperature sensed by the right radiation pyrometer 52 commences.

The automatic timed firing reversal system 34 causes the right reversal valve 44 to close while the left reversal valve 40 still remains closed for purging of the furnace.

As the right reversal valve 44 closes the limit switch 98 on the right reversal valve 44 opens and de-energizes relay coil 102. The contact 106 closes, energizing relay coil 108. Energization of relay coil 108 closes contact 110 connecting the left radiation pyrometer to the potentiometric measuring circuit of unit 92 and another contact 104 opens de-energizing the relay coil 84. Contact 86 now opens and thereby de-energizes balancing motor 76. This action permits the instrument to hold a recording instrument pen 94 in its last temperature sensing position while another purge of the gases in the furnace takes place and a stabilized flame is established. The entire cycle is then repeated.

The type of the potentiometric circuit and controlling unit 92 having proportional band and automatic reset is similar to that disclosed in the W. P. Wills U.S. Patent 2,423,540.

This unit 92 has an inlet conduit 112 for supplying a filtered air supply F.A.S. under pressure thereto and an outlet conduit 114 for transmitting a pneumatic control signal to a valve actuator 116. The valve actuator 116 in turn is employed to move a linkage 118 attached thereto to regulate the position of valves 120 and 122 and thereby adjust the amount of fuel being fed to the furnace 10 with temperature changes occurring in the bridgewall 48 or 30 which are alternately sensed by radiation pyrometer 52 and 56.

FIGURE 4 discloses the condition that the balancing motor 76, the right and left radiation pyrometers 52, 56, the right and left fuel valves 44, 40, the timer 68, and relays 64, 102 will be in during the aforementioned described control conditions.

Figure 6:
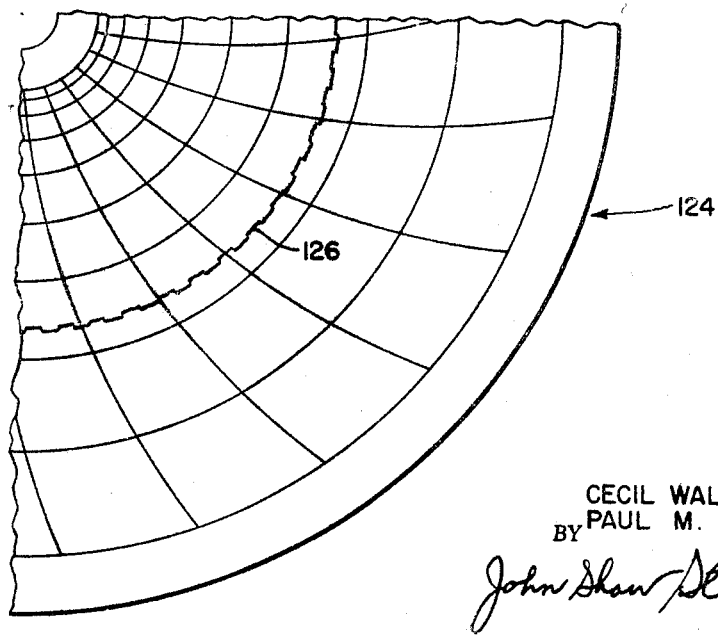

FIGURE 6 shows a segment of the chart 124 on which the pen 94 of the potentiometric circuit and controlling unit 92, shown in FIG. 1, has automatically inscribed a record 126 of the temperature of the molten glass 28 in the furnace 10 by taking the previously described temperature measurement of the bridgewall portions 30 and 48.

The chart record 126 shows that the furnace temperature control apparatus disclosed herein is very effective in keeping the temperature of the furnace at a substantially constant temperature level as control is shifted from pyrometer 52 to 56 and vice versa.

It can be seen that since the controlling effect of the controller is not changed between the time it takes the furnace to go from one stabilized flame condition to another by the apparatus disclosed herein a much faster control than has heretofore been possible with other glass furnace temperature control systems can thus be effective and provide the excellent uniform temperature effect desired over a required period of time as shown by the previously described record 126 on the chart 124 in FIGURE 6.

From the aforementioned description it can be seen that an apparatus has been disclosed that will provide a rapid automatically operated means to raise and/or lower the temperature of the furnace in accordance with changes occurring in the temperature of its bridgewall when a stabilized flame condition is present in the furnace.

What is claimed is:

1. An apparatus to maintain the thermal stability of a regenerative melting furnace and the temperature of molten material therein prior to its movement from its melter section by way of a substantially centrally located passageway in the bridge wall of the melter to its refiner section at a substantially preselected fixed value, comprising separate sginal generating radiant energy temperature responsive means, a first one of said temperature responsive means being positioned to sight on an exposed wall surface of the bridge wall that is adjacent a side of said passageway that is closest to the first responsive means, the second responive means being positioned to sight on an exposed wall surface of the bridge wall that is adjacent another side of said passageway that is closest to said second responsive means, a timed fuel automatic reversing system under a first condition being adapted to supply fuel to a first one of two spaced apart burners positioned in an end wall of the furnace facing said bridge wall to produce a flame pattern directed in a clockwise direction that is out of contact with the bridge wall surface on which said first temperature responsive means is sighted and which contacts the bridge wall surface on which said second temperature responsive means is sighted, a temperature control switching circuit and a fuel regulating controller being electrically connected with the timed fuel automatic reversing system when it is being operated under said first condition to transmit the signal transmitted by said first temperature responsive means to said fuel regulating controller to regulate the fuel being transmitted to said first burner in accordance with the magnitude of said signal, and said timed fuel automatic reversing system under another condition being adapted to supply fuel through the second one of the burners to produce a flame pattern directed in a counter-clockwise direction that remains out of contact with the bridge wall surface on which said second temperature responsive means is sighted and which is brought into contact with the bridge wall surface on which said first temperature responsive means is sighted, said temperature control switching circuit and the fuel regulating controller being electrically connected with the time fuel automatic reversing system when it is being operated under said other condition to transmit the signal transmitted by said second temperature responsive means to said fuel regulating controller to regulate the fuel being transmitted to said second burner in accordance with the magnitude of said signal.

References Cited

UNITED STATES PATENTS

| | | | |
|---|---|---|---|
| 1,812,534 | 6/1931 | Jewett | 65—162 XR |
| Re. 19,025 | 12/1933 | Soubier | 65—162 XR |
| 2,098,625 | 11/1937 | Honiss | 65—162 XR |
| 3,374,074 | 3/1968 | Russell et al. | 65—162 XR |
| 3,393,868 | 7/1968 | Griem. | |

S. LEON BASHORE, Primary Examiner

F. W. MIGA, Assistant Examiner

U.S. Cl. X.R.

65—135, 157, 337, 346, 355; 165—97; 236—15